US005968812A

United States Patent [19]

Mrachko

[11] Patent Number: 5,968,812

[45] Date of Patent: Oct. 19, 1999

[54] REMOVAL OF SULFINIC ACIDS

[75] Inventor: Gregory T. Mrachko, Spring, Tex.

[73] Assignee: Energy BioSystems Corporation, The Woodlands, Tex.

[21] Appl. No.: 09/017,246

[22] Filed: Feb. 2, 1998

[51] Int. Cl.$^6$ .......... B09B 3/00

[52] U.S. Cl. .......... 435/262; 435/262.5; 435/282; 208/219; 208/237; 208/248

[58] Field of Search .......... 435/262, 262.5, 435/282; 208/208 R, 219, 237, 248

[56] References Cited

U.S. PATENT DOCUMENTS

| | | | |
|---|---|---|---|
| 4,562,156 | 12/1985 | Isbister et al. | 435/253 |
| 5,002,888 | 3/1991 | Kilbane, II | 435/252.31 |
| 5,094,668 | 3/1992 | Kern et al. | 44/622 |
| 5,104,801 | 4/1992 | Kilbane, II | 435/282 |
| 5,132,219 | 7/1992 | Kilbane, II | 435/195 |
| 5,198,341 | 3/1993 | Kilbane, II | 435/42 |
| 5,344,778 | 9/1994 | Kilbane, II | 435/262 |
| 5,356,801 | 10/1994 | Rambosek et al. | 435/195 |
| 5,356,813 | 10/1994 | Monticello | 435/282 |
| 5,358,869 | 10/1994 | Kilbane, II | 435/282 |
| 5,358,870 | 10/1994 | Monticello et al. | 435/282 |
| 5,607,857 | 3/1997 | Grossman et al. | 435/282 |

OTHER PUBLICATIONS

Kilbane II, J.J., "Sulfur–Specific Microbial Metabolism of Organic Compounds," Resour. Cons. Recycl. 3: 69–79 (1990).

Hartdegan, F.J. et al., "Microbial Desulfurization of Petroleum: Developments in genetic engineering have led to the possibility of a bioprocess route to clean up sulfur in oil," *Chem. Eng. Progress*: 63–67 (May 1984).

Kilbane, J.J. "Biodesulfurization: Future Prospects in Coal Cleaning," in Proc. 7th Ann. Int'l. Pittsburg Coal Conf. : 373–382 (Sep. 10–14, 1990).

Omori, T., et al., "Desulfurization of Dibenzothiophene by Corynebacterium sp. Strain SY1," *Appl. Env. Microbiol.*, 58 (3) : 911–915 (1992).

Izumi, Y., et al., "Selective Desulfurization of Dibenzothiophene by *Rhodococcus erythropolis* D–1," *Appl. Env. Microbiol.*, 60(1) : 223–226 (1994).

Lee, M.K., et al., "Sulfur–Specific Microbial Desulfurization of Sterically Hindered Analogs of Dibenzothiophene," *Appl. Environ. Microbiol.*, 61 (12) : 4362–4366 (1995).

Gray, K.A., et al., "Molecular mechanisms of biocatalytic desulfurization of fossil fuels," *Nature Biotech.*, 14 : 1705–1709 (1996).

Tramondozzi, J.E., "Organic Reactions in Fused Salt Media II: Desulfination Reactions of Sodium Arylsulfinates; Other Preliminary Investigations," Ph.D. Thesis, Boston College, Boston MA(1972).

Peters, W., "Ueber das Verhalten aromatischer Sulfinsäuren gegen Mercurisalze," *Ber. Deut. Chem. Ges. 38*:2567–2570 (1905).

Brush, J.R., et al., "Sulphinate complex intermediates in the Peters reaction," *J. Organometal. Chem. 34*:C1–C3 (1972).

Oldfield, C., et al., "Elucidation of the metabolic pathway dibenothiophene desulphuriization by *Rhodoccucus* sp. strain IGTS8 (ATCC 53968), " *Microbiology* 143:2961–2973 (1997).

van Afferden, M., et al., "biochemical mechanisms for the desulfurization of coal–relevant organic sulfur compounds," *Fuel* 72 (12) :1635–1643 (1993).

Mihara, H., et al., "Cysteine Sulfinate Desulfinase, a NIF-S–like Protein of *Escherichia coli* with Selenocysteine Lyase and Cysteine Desulfurase Activities, " *J. Biol. Chem.* 272 (36) :22417–22424 (1997).

Rhee, S–K, et al., "Desulfurization of Dibenzothiophene and Diesel Oils by a Newly Isolated *Gordona* Strain, CYKS1, " *App. Env. Microbiol.* 64(6) :2327–2331 (1998).

Hiscock, S.D., et al., "Desulfination of Allylic Sulfinic Acids: Characterization of aRetro–Ene Transition State, " *J. Org. Chem.* 60:7166–7169 (1995).

Koslov, V.A. and Bagrovskaya, N.A., "Protodesulfaonation of arenesulfonic acids in aqueous mineral acid solutions, " *Zh. Org. Khim.* 25(6) :1280–1288 (1989) (wtih English abstract).

Downs, R.L. and Wojcicki, A., "Reactions of Cyclopentadienylmetal–2–Alkenyl Carbonyl Complexes with Sulfur Dioxide. Isolation and Characterization of Metal–n–Alkenesulfinate Intermediates, " *Inorg. Chim. acta* 27:91–103 (1978).

Deacon, G.B. and Johnson, I.K., "organothallium Compounds. XI. Reactions of Thallic Salts with Some Sodiu, Arenesulphinates, " J. *Organomet. Chem.* 112:123–133 (1976).

Gallagher, J.R., et al., "Microbiol desulfurization of dibenzothiphene: a sulfur–specific pathway, " *FEMS Microbiol. Lett.* 107:31–36 (1993).

*Primary Examiner*—David A. Redding
*Attorney, Agent, or Firm*—Hamilton, Brook, Smith & Reynolds, P.C.

[57] ABSTRACT

The invention relates to the unexpected discovery that the removal of the sulfinate group from an organosulfinate compound can be improved in the presence of an effective amount of a Lewis acid. The invention includes a method of removing the sulfinic acid functional group from an organosulfinic acid compound, comprising reacting the organosulfinic acid compound with an effective amount of a Lewis acid.

5 Claims, No Drawings

REMOVAL OF SULFINIC ACIDS

BACKGROUND OF THE INVENTION

The microbial and chemical desulfurization of fossil fuels has been an area of active investigation for over fifty years. The object of these investigations has been to develop chemical and biotechnology based methods for the pre-combustion removal of sulfur from fossil fuels, such as coal, crude oil and petroleum distillates. The driving forces for the development of desulfurization methods are the increasing levels of sulfur in fossil fuel and the increasingly stringent regulation of sulfur emissions. Monticello et al., "Practical Considerations in Biodesulfurization of Petroleum," IGT's 3d Intl. Symp. on Gas, Oil, Coal and Env. Biotech., (Dec. 3–5, 1990) New Orleans, La.

Many biocatalysts and processes have been developed to desulfurize fossil fuels, including those described in U.S. Pat. Nos. 5,356,801, 5,358,870, 5,358,813, 5,198,341, 5,132,219, 5,344,778, 5,104,801 and 5,002,888, incorporated herein by reference. Economic analyses indicate that one limitation in the commercialization of the technology is improving the reaction rates and specific activities of the biocatalysts, such as the bacteria and enzymes that are involved in the desulfurization reactions. The reaction rates and specific activities (sulfur removed/hour/gram of biocatalyst) that have been reported in the literature are much lower than those necessary for optimal commercial technology.

Among the intermediates in the biodesulfurization of fossil fuels are organosulfinate compounds. Removal of the sulfinate group from such compounds can be accomplished enzymatically. However, known chemical, or nonenzymatic, methods for desulfurizing organosulfinates require extreme conditions, such as fused salt media and high reaction temperatures, and typically result in low yields of desulfurized products.

Therefore, there is a need for improved methods for desulfurizing organosulfinate compounds.

SUMMARY OF THE INVENTION

The invention relates to the unexpected discovery that the removal of a sulfinate group from an organosulfinate compound can be improved by the addition of an effective amount of a Lewis acid. In particular, the invention relates to improved methods of removing sulfinic acid or sulfinate groups from organosulfinate compounds, including aliphatic and aromatic sulfinate compounds.

In one embodiment, the organosulfinate compound is an arylsulfinate of the general formula

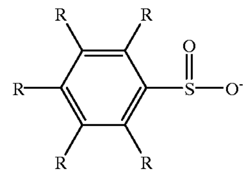

wherein each R is a hydrogen atom or one or more substituents, such as alkyl or aryl groups. The method comprises reacting the arylsulfinate with a protic solvent and an effective amount of the Lewis acid under conditions suitable for substitution of the sulfinate group with a hydrogen atom, producing a compound of the general formula

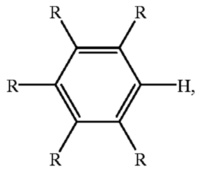

wherein R has the meaning set forth above.

The invention also provides a method for desulfurizing a carbonaceous material which includes organosulfur compounds. The method comprises the steps of (1) contacting the carbonaceous material with an aqueous phase containing a biocatalyst comprising capable of catalyzing the conversion of an organosulfur compound to an organosulfinate compound, thereby forming a carbonaceous material and aqueous phase mixture; (2) maintaining the mixture of step (1) under conditions sufficient for conversion of the organosulfur compound to an organosulfinate compound; and (3) contacting the organosulfinate compound with an effective amount of a Lewis acid in the presence of a protic solvent, thereby desulfinating the organosulfinate compound and producing a carbonaceous material having a reduced sulfur content.

DETAILED DESCRIPTION OF THE INVENTION

The present invention relates to a process for removing one or more sulfinate groups from an organosulfinate compound. The process comprises the step of contacting the organosulfinate compound with an effective amount of a Lewis acid in the presence of a protic solvent.

The term "organosulfinate compound", as used herein, refers to an organic compound which comprises the functional group —S(O)O$^-$, the deprotonated, or basic, form or —S(O)OH, the protonated, or acid, form. In the basic form, the organosulfinate compound will exist in combination with a cation. In solution, the protonation state of the sulfinate group will depend upon the solution pH. The sulfinate group is bonded to an organic radical, such as an alkyl group or an aryl group, via a carbon-sulfur bond. Organosulfinate compounds are illustrated herein in the basic form, but the acid form can also be used as the starting compound in the method of the invention. Organosulfinate compounds which are suitable for the desulfination process of the invention include alkylsulfinates, wherein the sulfinate group is bonded to an organic radical such as a substituted or unsubstituted normal, branched or cyclic alkyl group and arylsulfinates, wherein the sulfinate group is bonded to a substituted or unsubstituted aryl or heteroaryl group. Suitable alkyl or aryl substituents include halogen atoms, such as fluorine, chlorine, bromine and iodine atoms, hydroxyl groups, aryl groups, nitro groups, cyano groups, amino groups, and alkoxy groups.

In a preferred embodiment, the method relates to a method of removing a sulfinate group from an arylsulfinate compound, such as a substituted or unsubstituted benzenesulfinate of Formula I, (I)

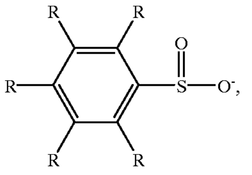

wherein each R is, independently, a hydrogen atom or one or more substituents, such as a substituted or unsubstituted alkyl, substituted or unsubstituted aryl, substituted or unsubstituted fused aliphatic or aromatic ring, halo, mercaptan, hydroxy, nitro, cyano, alkoxy, alkylthio, aryloxy, arylthio, amino, substituted amino, carboxyl, sulfonic acid, carboxamide, sulfonamide, carboxylic acid esters or sulfonic acid esters, for example. Aromatic groups can be carbocyclic or heterocyclic. Carbocyclic rings include phenyl, naphthyl, tetrahydronaphthyl, biphenyl, phenylalkylphenyl, phenylalkenylphenyl, phenoxyphenyl, phenylthiophenyl, phenylalkoxyphenyl, for example. Heterocyclic rings include pyridinyl, pyrimidinyl, quinolinyl, thiophenyl, furanyl, pyrazolyl, imidazolyl, pyrrolyl and thiazolyl, for example. Alkyl groups can be, for example, between 1 and about 20 carbons, preferably between 1 and about 4, and can be saturated or unsaturated, straight or branched chain or cyclic. Substituents for the above alkyl and aryl groups can be, for example, a substituted or unsubstituted alkyl, substituted or unsubstituted aryl, halo, mercaptan, hydroxy, nitro, cyano, alkoxy, alkylthio, aryloxy, arylthio, amino, substituted amino, carboxyl, sulfonic acid, carboxamide, sulfonamide, carboxylic acid esters or sulfonic acid esters.

In a particularly preferred embodiment, the arylsulfinate compound is a substituted or unsubstituted 2-(2-hydroxyphenyl)benzenesulfinate of Formula II, (II)

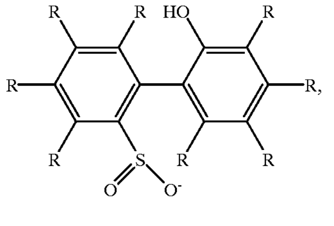

wherein R is as defined in Formula I. In preferred embodiments, each R is, independently, hydrogen or a normal or branched $C_1$–$C_8$-alkyl group. Such compounds occur as intermediates in the desulfurization of a fossil fuel, for example, in the oxidative desulfurization of dibenzothiophene or a substituted dibenzothiophene. This method can advantageously be substituted for the final enzymatic desulfurization step of the desulfurization processes described, for example, in U.S. Pat. Nos. 5,356,801 and 5,104,801, incorporated herein by reference, and in U.S. patent applications Ser. Nos. 08/351,754, 08/715,554, 08/735,963, 08/933,885, 08/851,088 and 08/851,089, each of which is incorporated herein by reference.

In one embodiment, the method of the invention comprises contacting the organosulfinate compound with an effective amount of a Lewis acid, under conditions sufficient for the substitution of a hydrogen atom for the sulfinate group. When the organosulfinate compound is a substituted or unsubstituted benzenesulfinate, the product of this process is a substituted or unsubstituted benzene of Formula III, (III)

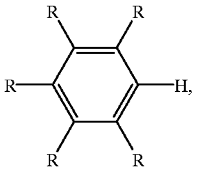

wherein R has the meaning defined for Formula I.

The reaction is carried out in the presence of a protic solvent. Suitable protic solvents include water and aqueous solutions, such as aqueous buffers and aqueous acids. Also included are protic organic solvents, such as alcohols, for example, methanol, ethanol, propanol and isopropanol, and organic acids, such as acetic acid. The protic solvent can also be a mixed solvent system which includes two or more protic solvents or a mixture of a protic solvent and an aprotic solvent, such as a non-protic organic solvent. The protic solvents of use herein are also intended to include solutions of an acid in an aprotic solvent, for example, a solution of HCl or an organic acid in an aprotic organic solvent.

In a preferred embodiment, the process is conducted in an aqueous medium. Preferably at least one mole equivalent of water is present for each sulfinate moiety. In a more preferred embodiment, water is present in substantial excess, such as at least about 10 mole equivalent, or is employed as the solvent.

Where the organosulfinate compound is substantially insoluble in water, a suitable solvent can be preferably employed. Examples of such a solvent include dimethylsulfoxide and N,N-dimethylformamide. Where the water phase is substantially immiscible with the solvent or insoluble organic sulfinic acid, the water contact can be improved by increasing the surface area of the phases. This can be accomplished, for example, by creating an emulsion or microemulsion, including a water-in-oil or oil-in-water emulsion. Surfactants can also be added to improve contact.

An "effective amount" of a Lewis acid, as the term is used herein, is an amount which results in the desulfination of a substantial amount of the starting sulfinic acid or sulfinate compound.

The Lewis acid is a metal-containing compound, such as a transition metal compound, or a main group metal compound or a metal in an elemental form. For example, the Lewis acid can be a halide compound of a main group or transition metal or a solid metal or mixed metal material. Lewis acids include "hard", "soft" or "borderline" Lewis acids, as defined by Huheey (Huheey, Inorganic Chemistry, second edition, Harper and Row (1978), incorporated herein by reference in its entirety). Preferably, the Lewis acid employed is a compound of Cu(II) or a soft Lewis acid, such as Cu(I), Ag(I), Cd(II), Pd(II), Pt(II), Hg(I), Hg(II), $BH_3$, and $GaCl_3$. For the present purposes, the term "soft Lewis acid" also includes elemental metals such as transition metals, such as palladium, platinum and copper, and mixtures of metals, such as metal alloys, for example, NiMo and CoMo. The Lewis acid can be soluble in the reaction medium (homogeneous) or insoluble (heterogeneous). Heterogeneous Lewis acids can be used, for example, as powders or on a solid support, such as alumina or a zeolite.

Particularly preferred Lewis acids include compounds of mercury and copper and palladium metal, such as palladium on alumina. For example, the Lewis acid can be a compound of Hg(I), Hg(II), Cu(I) or Cu(II). Suitable Lewis acids include salts of one of these metal cations with a suitable anion, for example, $HgCl_2$, $HgBr_2$, $Hg(NO_3)_2$, HgO, $CuCl_2$, $CuBr_2$, $Cu(NO_3)_2$, CuO and $Cu_2O$.

The Lewis acid is added in an amount effective to desulfinate a substantial amount of the starting sulfinate compound. Without being bound by theory, it is believed that the Lewis acid is acting as a catalyst in the desulfination process. If catalytically active, the Lewis acid can be added at a concentration of at least 0.1 mole equivalent (based on sulfinic acid), preferably at least about 0.5 mole equivalent. If the Lewis acid is a stoichiometric reagent in the desulfination process, this reagent is preferably added at a concentration of at least about 1 mole equivalent relative to the sulfinic acid.

The temperature of the reaction can be selected such as to optimize the reaction rate and is preferably elevated or above room temperature. Suitable reaction temperatures can be at least about 50° C., preferably at least about 100° C.

The reaction pressure is similarly selected to optimize the reaction rate and is preferably elevated or above atmospheric pressure. Suitable pressures can be at least about 10 psi, preferably at least about 15 psi. Suitable conditions for the reaction can be maintained, for example, in an autoclave.

The present method can be used advantageously in the desulfurization of a carbonaceous material comprising organosulfur compounds. The carbonaceous material can be, for example, a fossil fuel, such as petroleum, a petroleum distillate fraction, coal or a coal-derived liquid. For example, a fossil fuel comprising organosulfur compounds is contacted with a suitable biocatalyst under conditions suitable for the enzymatic conversion of an organosulfur compound to an organosulfinate compound. The thus reacted fossil fuel is then contacted, with or without purification or removal of the biocatalyst, with the Lewis acid described herein and subjected to the claimed invention. Where the biocatalytic reaction employs an aqueous phase, no further water needs to be added to the reaction medium. The intermediate fossil fuel obtained from the partial desulfurization is then contacted with the Lewis acid and heated under elevated pressure to complete the removal of the sulfur from the organic molecules.

Several investigators have reported the genetic modification of naturally-occurring bacteria into mutant strains capable of catabolizing dibenzothiophene (DBT). Kilbane, J. J., *Resour. Cons. Recycl.* 3: 69–79 (1990), Isbister, J. D., and R. C. Doyle, U.S. Pat. No. 4,562,156 (1985), and Hartdegan, F. J. et al., *Chem. Eng. Progress* 63–67 (1984). For the most part, these mutants desulfurize DBT nonspecifically, and release sulfur in the form of small organic sulfur breakdown products. Thus, a portion of the fuel value of DBT is lost through this microbial action. Isbister and Doyle reported the derivation of a mutant strain of Pseudomonas which appeared to be capable of selectively liberating sulfur from DBT.

Kilbane has reported the mutagenesis of a mixed bacterial culture, producing one which is capable of selectively liberating sulfur from DBT by the oxidative pathway. This culture was composed of bacteria obtained from natural sources such as sewage sludge, petroleum refinery wastewater, garden soil, coal tar-contaminated soil, etc., and maintained in culture under conditions of continuous sulfur deprivation in the presence of DBT. The culture was then exposed to the chemical mutagen 1-methyl-3-nitro-1-nitrosoguanidine. The major catabolic product of DBT metabolism by this mutant culture was hydroxybiphenyl; sulfur was released as inorganic water-soluble sulfate, and the hydrocarbon portion of the molecule remained essentially intact as monohydroxybiphenyl. Kilbane, J. J., *Resour. Cons. Recycl.* 3: 69–79 (1990), the teachings of which are incorporated herein by reference.

Kilbane has also isolated a mutant strain of Rhodococcus from this mixed bacterial culture. This mutant, IGTS8 or ATCC No. 53968, is a particularly preferred biocatalyst for use with the instant invention. The isolation and characteristics of this mutant are described in detail in J. J. Kilbane, U.S. Pat. No. 5,104,801, the teachings of which are incorporated herein by reference. This microorganism has been deposited at the American Type Culture Collection (ATCC), 12301 Park Lawn Drive, Rockville, Md., U.S.A. 20852 under the terms of the Budapest Treaty, and has been designated as ATCC Deposit No. 53968. One suitable ATCC No. 53968 biocatalyst preparation is a culture of the living microorganisms, prepared generally as described in U.S. Pat. No. 5,104,801 and mutants or derivatives thereof (see, e.g. U.S. Pat. No. 5,358,869). Cell-free enzyme preparations obtained from ATCC No. 53968 or mutants thereof generally as described in U.S. Pat. Nos. 5,132,219, 5,344,778 and 5,358,870 can also be used. These enzyme preparations can further be purified and employed. Another suitable biocatalyst for the conversion of an organosulfur compound to an organosulfinate compound is *Sphingomonas sp.* strain AD109 and desulfurization enzymes derived therefrom, as described in U.S. patent application Ser. No. 08/851,089.

There are at least two possible types of pathways which result in the specific release of sulfur from DBT: oxidative and reductive. Preferably, an oxidative (aerobic) pathway is followed, resulting in the formation of an organosulfinate intermediate. Examples of microorganisms that act by this oxidative pathway, preparations of which are suitable for use as the biocatalyst in the present invention include the microbial consortium (a mixture of several microorganisms) disclosed in Kilbane, *Resour. Conserv. Recycl.*, 3: 69–79 (1990), the microorganisms disclosed by Kilbane in U.S. Pat. Nos. 5,002,888 (issued Mar. 26, 1991), 5,104,801 (issued Apr. 14, 1992), 5,344,778, 5,132,219, 5,198,341, 5,356,813 and 5,358,870 [also described in Kilbane (1990), Biodesulfurization: Future Prospects in Coal Cleaning, in Proc, 7th Ann. Int'l. Pittsburgh Coal Conf.: 373–382]. Preferred biocatalysts of the invention are *Rhodococcus sp.* IGTS8 (ATCC 53968) and *sphingomonas sp.* strain AD109. Other desulfurizing microorganisms which are suitable nucleic acid molecule sources include *Corynebacterium sp.* strain SY1, as disclosed by Omori et al., *Appl. Env. Microbiol.*, 58: 911–915 (1992); *Rhodococcus erythropolis* D-1, as disclosed by Izumi et al., *Appl. Env. Microbiol.*, 60: 223–226 (1994); the Arthrobacter strain described by Lee et al., *Appl. Environ. Microbiol.* 61: 4362–4366 (1995) and the Rhodococcus strains (ATCC 55309 and ATCC 55310) disclosed by Grossman et al., U.S. Pat. No. 5,607,857, each of which is incorporated herein by reference in its entirety. Each of these microorganisms is believed to produce one or more enzymes (protein biocatalysts) that catalyze one or more reactions in the desulfurization of DBT.

The biocatalyst can also be a recombinant organism which contains a heterologous DNA molecule which encodes one or more desulfurization enzymes, or enzymes derived therefrom. For example, pseudomonad organisms comprising heterologous desulfurization genes from Rhodococcus IGTS8 and Sphingomonas AD109 are described in U.S. patent application Ser. No. 08/851,088.

Each of the foregoing microorganisms can function as a biocatalyst in the present invention because each produces one or more enzymes (protein biocatalysts) that carry out the specific chemical reaction(s) by which sulfur is excised from refractory organosulfur compounds. Lehninger, Principles of Biochemistry (Worth Publishers, Inc., 1982), p. 8-9; cf. Zobell in U.S. Pat. No. 2,641,564 (issued Jun. 9, 1953) and Kern et al. in U.S. Pat. No. 5,094,668 (issued Mar. 10, 1992). Mutational or genetically engineered derivatives of any of the foregoing microorganisms, as exemplified by the U.S. patents listed above, can also be used as the biocatalyst herein, provided that appropriate biocatalytic function is retained.

Additional microorganisms suitable for use as the biocatalyst or biocatalyst source in the desulfurization process now described can be derived from naturally occurring microorganisms by known techniques. As set forth above, these methods include culturing preparations of microorganisms obtained from natural sources such as sewage sludge, petroleum refinery wastewater, garden soil, or coal tar-contaminated soil under selective culture conditions in which the microorganisms are grown in the presence of refractory organosulfur compounds such as sulfur-bearing heterocycles as the sole sulfur source; exposing the microbial preparation to chemical or physical mutagens; or a combination of these methods. Such techniques are recounted by Isbister and Doyle in U.S. Pat. No. 4,562,156 (issued Dec. 31, 1985); by Kilbane in 3 *Resour. Conserv. Recycl.* 3: 69–79 (1990), U.S. Pat. Nos. 5,002,888, 5,104,801 and 5,198,341; and by Omori and coworkers in *Appl. Env. Microbiol.* 58 : 911–915 (1992), all incorporated by reference.

The reaction results in the formation of inorganic sulfur or sulfate, which can be readily removed from the organic product, or fossil fuel. For example, the sulfate can be removed by extraction, ion exchange or precipitation. The organic product, optionally, can also be removed from the reaction stream by, for example, distillation, extraction, or liquid chromatography.

The invention will now be described more specifically by the examples.

EXAMPLES

Example 1

Desulfination of 2-(2-hydroxyphenyl) benzenesulfinic Acid in the Presence of $HgCl_2$ An aqueous solution of 2-(2-hydroxyphenyl) benzenesulfinic acid (HPBS) containing 1 mole equivalent of $HgCl_2$ was maintained at 121° C. at 15–17 psi. in an autoclave for one hour. By validated HPLC analysis, the reaction products and their percent yield were found to be unreacted HPBS (5%) and 2-hydroxybiphenyl (37%) plus an undetermined amount of biphenylsultine (BPS) and an unidentified product believed to be 2-(2-hydroxyphenyl)benzenesulfonic acid. The experiment establishes that the reaction successfully results in the removal of the sulfinic acid group from the organic radical.

Example 2

Desulfination of 2-(2-hydroxyphenyl) benzenesulfinic Acid in the Presence of Supported Palladium An aqueous solution of 2-(2-hydroxyphenyl) benzenesulfinic acid (HPBS) containing 1 mole equivalent of palladium on alumina was maintained at 121° C. at 15–17 psi. in an autoclave for one hour. By validated HPLC analysis, the reaction product was found to contain less than the detection limit of HPBS, 70% 2-hydroxybiphenyl (HBP) and less than 10% biphenylsultine. The experiment establishes that the reaction successfully results in the removal of the sulfinic acid group from HPBS.

Example 3

Desulfination of 2-(2-hydroxyphenyl) benzenesulfinic Acid in the Presence of $Cu_2O$ or $CuCl_2$ An aqueous solution of 2-(2-hydroxyphenyl) benzenesulfinic acid (HPBS) containing 1 mole equivalent of either $Cu_2O$ or $CuCl_2$ was prepared. Analysis of the reaction mixture by HPLC indicated the conversion of some of the 2-(2-hydroxyphenyl)benzenesulfinic acid to 2-(2-hydroxyphenyl)benzenesulfonic acid. The reaction mixture was then maintained in an autoclave at 121° C. and 15–17 psi. for one hour. By validated HPLC analysis, the reaction product was found to contain less than the detection limit of HPBS (<1%), 34–39% 2-hydroxybiphenyl (HBP), 2-(2-hydroxyphenyl)benzenesulfonic acid and an unidentified compound. The experiment establishes that the reaction successfully results in the removal of the sulfinic acid group from HPBS.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

We claim:

1. A method for desulfurizing a carbonaceous material which includes organosulfur compounds, comprising the steps of:

(a) contacting the carbonaceous material with an aqueous phase containing a biocatalyst capable of catalyzing the conversion of an organosulfur compound to an organosulfinate compound, thereby forming a carbonaceous material and aqueous phase mixture;

(b) maintaining the mixture of step (a) under conditions sufficient for conversion of the organosulfur compound to an organosulfinate compound; and (c) contacting the organosulfinate compound with an effective amount of a copper(II) compound or a soft Lewis acid in the presence of a protic solvent, thereby desulfinating the organosulfinate compound and producing a carbonaceous material having a reduced sulfur content.

2. The method of claim 1 wherein the carbonaceous material is a fossil fuel.

3. The method of claim 2 wherein the fossil fuel is petroleum or a petroleum distillate fraction.

4. The method of claim 1 wherein the biocatalyst is Rhodococcus strain IGTS8, Sphingomonas strain AD109, or enzymes derived therefrom.

5. The method of claim 1 wherein the biocatalyst is a recombinant organism containing a heterologous nucleic acid molecule which encodes one or more desulfurization enzymes, or desulfurization enzymes derived therefrom.

* * * * *